(12) United States Patent
Kashiwakura et al.

(10) Patent No.: US 12,548,443 B2
(45) Date of Patent: Feb. 10, 2026

(54) INFORMATION PROCESSING DEVICE FOR MANAGING OPERATION OF AN ON-DEMAND BUS, INFORMATION PROCESSING METHOD FOR MANAGING OPERATION OF AN ON-DEMAND BUS, AND INFORMATION PROCESSING SYSTEM FOR MANAGING OPERATION OF AN ON-DEMAND BUS

(71) Applicant: TOYOTA JIDOSHA KABUSHIKI KAISHA, Toyota (JP)

(72) Inventors: Toshiki Kashiwakura, Nagakute (JP); Takahiro Aoki, Nagoya (JP); Tsuyoshi Okada, Nagoya (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 489 days.

(21) Appl. No.: 18/068,554

(22) Filed: Dec. 20, 2022

(65) Prior Publication Data

US 2023/0251609 A1    Aug. 10, 2023

(30) Foreign Application Priority Data

Feb. 10, 2022   (JP) .................. 2022-019805

(51) Int. Cl.
| | |
|---|---|
| *G08G 1/123* | (2006.01) |
| *G05B 15/02* | (2006.01) |
| *G06Q 50/40* | (2024.01) |
| *G06Q 50/43* | (2024.01) |
| *G06Q 50/47* | (2024.01) |

(Continued)

(52) U.S. Cl.
CPC ............. *G08G 1/123* (2013.01); *G05B 15/02* (2013.01); *G06Q 50/40* (2024.01); *G06Q 50/43* (2024.01); *G06Q 50/47* (2024.01); *H04W 4/029* (2018.02); *H04W 4/42* (2018.02); *H04W 4/44* (2018.02); *B60W 60/00253* (2020.02); *B60W 2300/10* (2013.01)

(58) Field of Classification Search
CPC .. G05B 15/02; G06Q 10/063; G06Q 10/0631; G06Q 50/40; B60W 60/00253; G08G 1/123; H04W 4/40; H04W 4/42; H04W 4/44
USPC ......................................................... 700/275
See application file for complete search history.

(56) References Cited

U.S. PATENT DOCUMENTS 9,262,915 B2 *   2/2016   Clem ..................... G08G 1/08
10,506,396 B2 * 12/2019   Shen ..................... G08G 1/20
(Continued)

FOREIGN PATENT DOCUMENTS

| CN | 202976459 U | * | 6/2013 |
|---|---|---|---|
| CN | 208184298 U | | 12/2018 |

(Continued)

*Primary Examiner* — Crystal J Barnes-Bullock
(74) *Attorney, Agent, or Firm* — Dickinson Wright, PLLC

(57) ABSTRACT

An information processing device of the present disclosure includes a control unit configured to control a plurality of output devices provided in an operation area of an on-demand bus. The control unit identifies a first output device close to a boarding place of the on-demand bus among the output devices. The control unit transmits a first command to output an indication of a bus stop of the on-demand bus to the first output device at a first timing that is earlier by a first time length than a boarding date of a user.

7 Claims, 6 Drawing Sheets

(51) Int. Cl.
*H04W 4/029* (2018.01)
*H04W 4/42* (2018.01)
*H04W 4/44* (2018.01)
*B60W 60/00* (2020.01)

(56) References Cited

U.S. PATENT DOCUMENTS

| | | | | |
|---|---|---|---|---|
| 11,107,352 | B2* | 8/2021 | Ramot | G06N 5/04 |
| 11,830,363 | B2* | 11/2023 | Ramot | G01C 21/3469 |
| 11,859,988 | B2* | 1/2024 | Rakah | G08G 1/0129 |
| 12,111,167 | B2* | 10/2024 | Nagata | G06Q 30/0207 |
| 12,293,587 | B2* | 5/2025 | Nonaka | G06F 3/14 |
| 12,307,391 | B2* | 5/2025 | Nonaka | G06Q 10/02 |
| 12,394,316 | B2* | 8/2025 | Kashiwakura | G08G 1/123 |
| 2018/0279097 | A1* | 9/2018 | Shen | G06Q 10/0631 |
| 2019/0012613 | A1* | 1/2019 | Ikeda | G06Q 10/02 |
| 2020/0327317 | A1* | 10/2020 | Park | G05D 1/021 |
| 2020/0410408 | A1* | 12/2020 | Shitara | B60N 2/002 |
| 2021/0223051 | A1* | 7/2021 | Hochberg | G01C 21/3492 |
| 2022/0306159 | A1* | 9/2022 | Kim | G06Q 10/063 |
| 2022/0412760 | A1* | 12/2022 | Nagata | G06Q 10/02 |
| 2023/0401950 | A1* | 12/2023 | Nagata | G08G 1/005 |
| 2024/0020585 | A1* | 1/2024 | Jikuhara | G06Q 10/02 |
| 2024/0021082 | A1* | 1/2024 | Kashiwakura | G06V 20/53 |
| 2024/0068826 | A1* | 2/2024 | Nagata | G08G 1/0133 |
| 2025/0050874 | A1* | 2/2025 | Beinborn | B60W 30/09 |

FOREIGN PATENT DOCUMENTS

| | | | | |
|---|---|---|---|---|
| CN | 109118756 A | * | 1/2019 | ............. G08G 1/005 |
| CN | 220064905 U | * | 11/2023 | |
| EP | 4310746 A1 | * | 1/2024 | ............. G06Q 50/40 |
| JP | 2003173497 A | | 6/2003 | |
| JP | 2004234469 A | | 8/2004 | |
| JP | 4005397 B2 | * | 11/2007 | |
| JP | 2016224500 A | * | 12/2016 | |
| JP | 2019192132 A | | 10/2019 | |
| JP | 2021051431 A | | 4/2021 | |
| JP | 6998827 B2 | * | 1/2022 | ............. G06Q 50/40 |
| JP | 7117939 B2 | * | 8/2022 | ............. G06Q 50/40 |
| JP | 2023096084 A | * | 7/2023 | |
| JP | 2023096086 A | * | 7/2023 | |
| JP | 7582225 B2 | * | 11/2024 | ............. G06Q 50/40 |
| JP | 7601062 B2 | * | 12/2024 | ............. G06Q 50/40 |
| KR | 200365468 Y1 | | 10/2004 | |
| KR | 200396110 Y1 | | 9/2005 | |
| KR | 101815885 B1 | * | 1/2018 | ............. G06Q 50/30 |
| KR | 102057005 B1 | * | 1/2020 | ............. G08G 1/127 |
| KR | 20210019769 A | * | 2/2021 | ............ B60W 50/14 |
| KR | 102585691 B1 | * | 10/2023 | ........... H05B 47/115 |
| WO | 2020076536 A1 | | 4/2020 | |

* cited by examiner

FIG. 4

| DEVICE ID | POSITION |
|-----------|----------|
| ~~~ ~~~ ~~~ ~~~ | ~~~~ ~~~~ ~~~~ ~~~~ |
| ~~~ ~~~ ~~~ ~~~ | ~~~~ ~~~~ ~~~~ ~~~~ |
| ⋮ | ⋮ |

FIG. 5

| REQUEST ID | DEVICE ID | FIRST TIMING |
|---|---|---|
| ———— ———— ———— ———— | ———— ———— ———— ———— | ———— ———— ———— ———— |
| ———— ———— ———— ———— ———— | ———— ———— ———— ———— | ———— ———— ———— ———— |
| ⋮ | ⋮ | ⋮ |

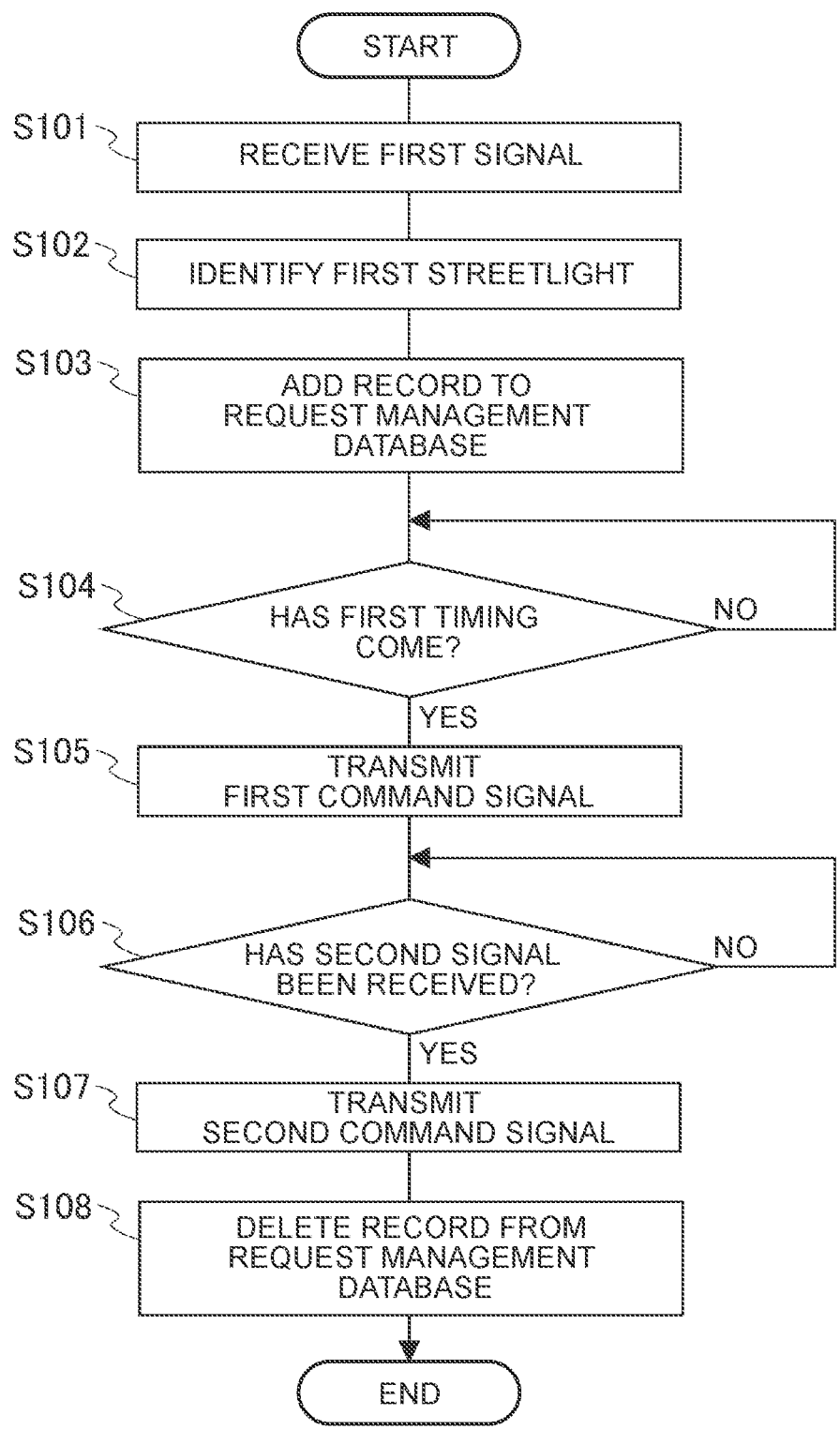

INFORMATION PROCESSING DEVICE FOR MANAGING OPERATION OF AN ON-DEMAND BUS, INFORMATION PROCESSING METHOD FOR MANAGING OPERATION OF AN ON-DEMAND BUS, AND INFORMATION PROCESSING SYSTEM FOR MANAGING OPERATION OF AN ON-DEMAND BUS

CROSS-REFERENCE TO RELATED APPLICATION

This application claims priority to Japanese Patent Application No. 2022-019805 filed on Feb. 10, 2022, incorporated herein by reference in its entirety.

BACKGROUND

1. Technical Field

The present disclosure relates to an information processing device, an information processing method, and an information processing system.

2. Description of Related Art

There is known an operation management device that acquires position information of a user expected to ride a vehicle traveling along a predetermined operation route, sets a virtual stop where the user is expected to board the vehicle by using the acquired position information, and notifies the user about the position of the virtual stop (see, for example, Japanese Unexamined Patent Application Publication No. 2021-51431 (JP 2021-51431 A)).

SUMMARY

The present disclosure provides a technology that allows a user and a driver of an on-demand bus to easily find a boarding place of the on-demand bus.

One aspect of the present disclosure relates to an information processing device. In that case, the information processing device may include, for example, a control unit configured to:
  identify a first output device close to a boarding place of an on-demand bus; and
  transmit, to the first output device, a first command to output an indication of a bus stop of the on-demand bus.

One aspect of the present disclosure relates to an information processing method. In that case, for example, a computer may execute the information processing method including:
  identifying a first output device close to a boarding place of an on-demand bus; and transmitting, to the first output device, a first command to output an indication of a bus stop of the on-demand bus.

One aspect of the present disclosure relates to an information processing system including a plurality of output devices installed on and around, or and or around roads in an operation area of an on-demand bus, and a server device connected to the output devices via a network. In that case, the server device may be configured to, for example:
  identify a first output device close to a boarding place of the on-demand bus among the output devices; and
  transmit, to the first output device, a first command to output an indication of a bus stop of the on-demand bus.

One aspect of the present disclosure relates to an information processing program for causing a computer to execute the information processing method, or a non-transitory computer-readable storage medium storing the information processing program.

According to the present disclosure, it is possible to provide the technology that allows the user and the driver of the on-demand bus to easily find the boarding place of the on-demand bus.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram showing an example of information stored in a device management database;

FIG. 5 is a diagram showing an example of information stored in a request management database; and FIG. 6 is a flowchart showing a processing routine that is executed by the second server device according to the embodiment.

DETAILED DESCRIPTION OF EMBODIMENTS

Figure 1:
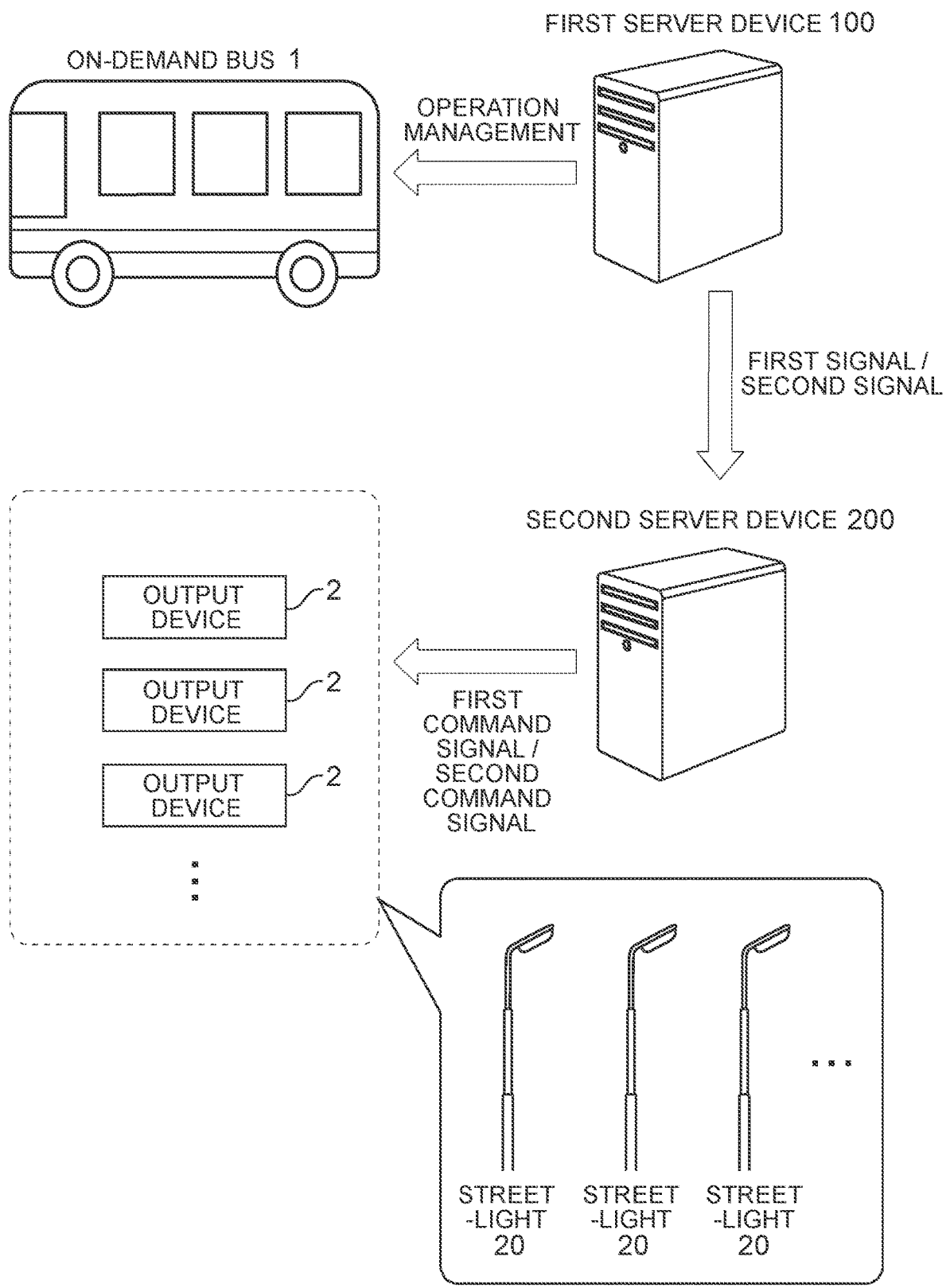
FIG. 1 is a diagram showing a schematic configuration of a bus stop indication system according to an embodiment.

In recent years, on-demand buses that operate based on boarding and drop-off places and boarding and drop-off dates arbitrarily designated by users have widely been put into use. Unlike fixed route buses such as city buses and express buses, the on-demand buses operate based on, for example, the boarding and drop-off places and the boarding and drop-off dates arbitrarily designated by the users. Therefore, the places serving as boarding places of the on-demand buses may have no marks (for example, signs indicating bus stops) like the bus stops of the fixed route buses. When a place having no sign of a bus stop is designated as the boarding place, the user may have difficulty in finding the boarding place. The user may be worried about whether the on-demand bus will stop at the place designated by the user. Further, the driver of the on-demand bus may have difficulty in finding the boarding place designated by the user. Therefore, it is desirable to mark the boarding place of the user for the operation of the on-demand bus.

In an information processing device according to the present disclosure, a control unit identifies a first output device close to the boarding place of the on-demand bus. The boarding place of the on-demand bus is a place where the user is expected to board the on-demand bus, and is arbitrarily designated by the user. The place designated by the user may be inappropriate as a stop place for the on-demand bus. In this case, the on-demand bus service provider may designate, as the boarding place, a place located near the place designated by the user and appropriate as the stop place for the on-demand bus. The first output device is an output device provided to a structure close to the boarding place among a plurality of output devices installed at a plurality of locations in an operation area of the on-demand bus. The output devices are devices having their main functions different from a function of outputting an indication of the bus stop of the on-demand bus.

The control unit of the information processing device according to the present disclosure transmits a first command to output the indication of the bus stop of the on-demand bus to the identified first output device. The first output device that has received the first command outputs the indication of the bus stop of the on-demand bus. Thus, the user can find the boarding place of the on-demand bus with the indication from the first output device as a mark. Further, it is possible to reduce the occurrence of a case where the user is worried about whether the on-demand bus will stop at the place designated by the user. Furthermore, the driver of the on-demand bus can find the boarding place designated by the user with the indication from the first output device as a mark.

The first output device according to the present disclosure may be a signage device installed on a guardrail close to the boarding place of the on-demand bus. The signage device may have a main function of, for example, showing a guide sign, a warning sign, a regulatory sign, an instruction sign, an assist sign, or an advertisement. The control unit may transmit a command to output a sign indicating the bus stop of the on-demand bus as the first command to the signage device installed on the guardrail close to the boarding place of the on-demand bus. Thus, the mark of the bus stop can be generated by using the existing signage device installed on the guardrail close to the boarding place of the on-demand bus.

The first output device according to the present disclosure may be a signage device installed on a pole (for example, a utility or telegraph pole) close to the boarding place of the on-demand bus. The signage device may have a main function of, for example, showing an address, disaster information, disaster prevention information, crime prevention information, or an advertisement. The control unit may transmit a command to output a sign indicating the bus stop of the on-demand bus as the first command to the signage device installed on the pole close to the boarding place of the on-demand bus. Thus, the mark of the bus stop can be generated by using the existing signage device installed on the pole close to the boarding place of the on-demand bus.

The first output device according to the present disclosure may be a signage device attached to a shop close to the boarding place of the on-demand bus. The signage device attached to a shop displays information to the outside of the shop, and is installed on, for example, an exterior wall of a shop that faces a road. The signage device may have a main function of, for example, showing the name or an advertisement of the shop to passersby on the road that faces the shop. The control unit may transmit a command to output a sign indicating the bus stop of the on-demand bus as the first command to the signage device attached to the shop close to the boarding place of the on-demand bus. Thus, the mark of the bus stop can be generated by using the existing signage device attached to the shop close to the boarding place of the on-demand bus.

The first output device according to the present disclosure may be an on-road indication device installed on a road at the boarding place of the on-demand bus. The on-road indication device may be, for example, a lane lighting device having a main function of showing lanes or a sign. The control unit may transmit a command to output a sign indicating the bus stop of the on-demand bus as the first command to the on-road indication device installed on the road at the boarding place of the on-demand bus. Thus, the mark of the bus stop can be generated by using the existing on-road indication device installed on the road at the boarding place of the on-demand bus.

The first output device according to the present disclosure may be a first streetlight installed close to the boarding place of the on-demand bus. The control unit may transmit, to the first streetlight installed around the boarding place of the on-demand bus, a command to turn ON the first streetlight in a manner different from manners of the other streetlights as the first command. Thus, the mark of the bus stop can be generated by using the existing streetlight installed close to the boarding place of the on-demand bus.

When the first streetlight is used as the first output device, the control unit may transmit, to the first streetlight as the first command, a command to turn ON the first streetlight in a light color different from light colors of the other streetlights installed around the boarding place of the on-demand bus. Thus, the user and/or the driver of the on-demand bus can find the boarding place by using, as a mark, the streetlight (first streetlight) that has been turned ON in the light color different from the light colors of the other streetlights.

When the first streetlight is used as the first output device and the other streetlights installed around the boarding place of the on-demand bus stay continuously ON, the control unit may transmit, to the first streetlight as the first command, a command to turn the first streetlight intermittently ON (blink the first streetlight). Thus, the user and/or the driver of the on-demand bus can find the boarding place with the blinking first streetlight as a mark.

When the first streetlight is used as the first output device, the other streetlights installed around the boarding place of the on-demand bus may stay continuously OFF. In that case, the control unit may transmit, to the first streetlight as the first command, a command to keep only the first streetlight continuously ON or turn only the first streetlight intermittently ON. Thus, the user and/or the driver of the on-demand bus can find the boarding place with the glowing or blinking first streetlight as a mark.

The first output device according to the present disclosure may be a first LED lamp installed on a guardrail close to the boarding place of the on-demand bus. The first LED lamp may have a main function of, for example, emitting guide light. The control unit may transmit, to the first LED lamp installed on the guardrail close to the boarding place of the on-demand bus, a command to turn ON the first LED lamp in a manner different from manners of the other LED lamps as the first command. The manner different from the manners of the other LED lamps may be the same manner as that in the case of the streetlight. Thus, the mark of the bus stop can be generated by using the existing LED lamp installed on the guardrail close to the boarding place of the on-demand bus.

The timing to transmit the first command from the information processing device to the first output device may be a timing when a terminal of a user expected to board the on-demand bus has entered a first area including the boarding place. The first area is, for example, an area where the user can see the boarding place (first output device). Alternatively, the first command may be transmitted from the information processing device to the first output device at a timing that is earlier by a first time length than a boarding date of the user expected to board the on-demand bus. The control unit of the information processing device according to the present disclosure may transmit, to the first output device, a second command to stop the output of the indication of the bus stop at a timing when the user has boarded the on-demand bus. With these methods, the period during which the first output device outputs the indication of the bus stop can be minimized.

The information processing device according to the present disclosure is, for example, a server device having a function of controlling the output devices installed in the operation area of the on-demand bus. The information processing device according to the present disclosure may be a server device having a function of managing the operation of the on-demand bus in addition to the function of controlling the output devices installed in the operation area of the on-demand bus. The control unit according to the present disclosure is a processor of the server device, such as a central processing unit (CPU) or a digital signal processor (DSP).

Embodiment

Hereinafter, a specific embodiment of the present disclosure will be described with reference to the drawings. The configurations and the like described in the following embodiment are not intended to limit the technical scope of the present disclosure to these configurations unless otherwise specified. In the present embodiment, the information processing device according to the present disclosure is applied to a bus stop indication system.

Overview of Bus Stop Indication System

FIG. 1 is a diagram showing an overview of a bus stop indication system according to a first embodiment. The bus stop indication system in the present embodiment includes a first server device 100 that manages an operation of an on-demand bus 1, a plurality of output devices 2 installed at a plurality of locations in an operation area of the on-demand bus 1, and a second server device 200 that controls the output devices 2.

The on-demand bus 1 is a vehicle that operates based on boarding and drop-off places and boarding and drop-off dates designated by users. The on-demand bus 1 may be a vehicle in which the operation route and the operation times are predetermined and only the boarding and drop-off places are changed in response to requests from the users.

The output devices 2 are devices that are provided in the operation area of the on-demand bus 1 and have their main functions different from a function of outputting an indication of a bus stop of the on-demand bus 1. Examples of the output devices 2 include a signage device installed on a guardrail, a signage device installed on a pole (for example, a utility or telegraph pole), a signage device attached to a shop, an on-road indication device installed on a road, a streetlight, and a light emitting diode (LED) lamp installed on a guardrail. The present embodiment is directed to an example in which the output devices 2 are streetlights 20 installed on roads in the operation area of the on-demand bus 1.

The first server device 100 receives request from users, and creates an operation plan of the on-demand bus 1. The request from the user includes a user's boarding place, a user's boarding date, a user's drop-off place, and a user's drop-off date. The operation plan includes an operation route of the on-demand bus 1, places where the on-demand bus 1 stops along the operation route (users' boarding and drop-off places), and operation times. The user's boarding place and the user's drop-off place are basically designated by the user. If the places designated by the user are inappropriate as stop places for the on-demand bus, the on-demand bus service provider may change, as the user's boarding place and the user's drop-off place, the designated places to places located near the places designated by the user and appropriate as the stop places for the on-demand bus.

The first server device 100 in the present embodiment has a function of, when the operation plan of the on-demand bus 1 is created, transmitting a signal for requesting output of an indication of a bus stop (hereinafter sometimes referred to as "first signal") to the second server device 200. The first signal includes a user's boarding place, a user's boarding date, and identification information of the request (hereinafter sometimes referred to as "request ID"). The first server device 100 in the present embodiment also has a function of, when the user has completed boarding the on-demand bus 1, transmitting a signal for requesting stop of output of the indication of the bus stop (hereinafter sometimes referred to as "second signal") to the second server device 200. The second signal includes identification information of the request. The identification information in the second signal is the same as the request ID in the first signal.

The second server device 200 controls the output devices 2 installed at the respective locations in the operation area of the on-demand bus 1. The second server device 200 controls the streetlights 20 installed on the respective roads in the operation area of the on-demand bus 1. For example, the second server device 200 turns OFF the streetlights 20 during the daytime, and turns ON the streetlights 20 during the nighttime.

The second server device 200 in the present embodiment has a function of, when the first signal is received from the first server device 100, identifying a streetlight 20 close to the user's boarding place among the streetlights 20 (hereinafter sometimes referred to as "first streetlight 20A"). The second server device 200 in the present embodiment also has a function of, at a first timing, transmitting a signal for outputting the indication of the bus stop (hereinafter sometimes referred to as "first command signal") to the first streetlight 20A. The first timing is, for example, a time that is earlier by a first time length than the user's boarding date. In a case where a terminal carried by the user and the second server device 200 are configured such that the second server device 200 can acquire a current position of the user's terminal, the first timing may be a timing when the current position of the user's terminal has entered a first area including the user's boarding place. The first area is, for example, an area where the user can see the first streetlight 20A. The second server device 200 also has a function of, when the second signal is received from the first server device 100, transmitting a signal for stopping the output of the indication of the bus stop (hereinafter sometimes referred to as "second command signal") to the first streetlight 20A.

Hardware Configuration of Bus Stop Indication System

Figure 2:
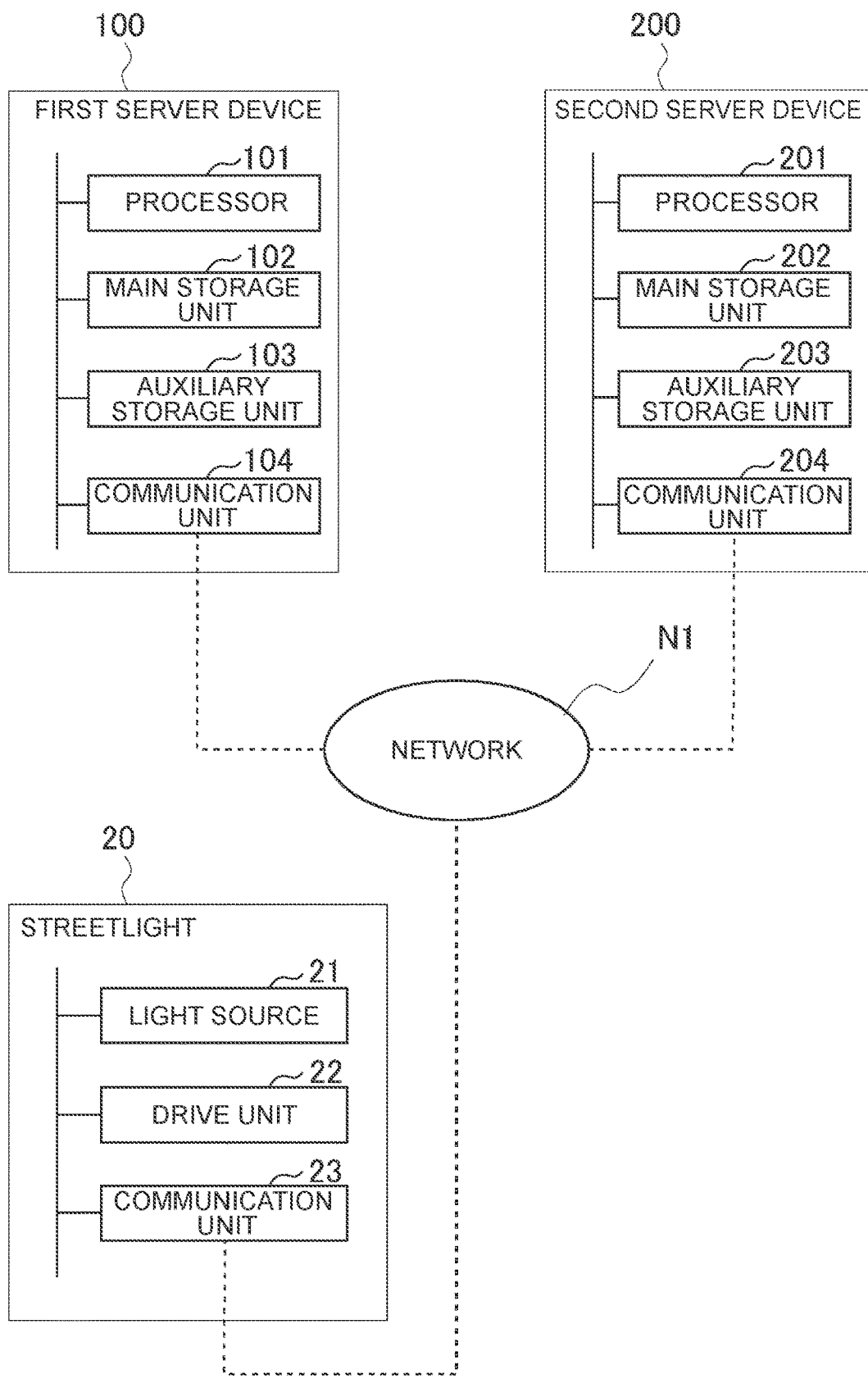
FIG. 2 is a diagram showing an example of hardware configurations of a streetlight, a first server device, and a second server device in the bus stop indication system according to the embodiment.

An example of a hardware configuration of the bus stop indication system according to the present embodiment will be described with reference to FIG. 2. FIG. 2 is a diagram showing an example of hardware configurations of the streetlight 20, the first server device 100, and the second server device 200 in the bus stop indication system shown in FIG. 1. In the example shown in FIG. 2, only one streetlight 20 is shown, but the bus stop indication system includes as many streetlights 20 as those installed in the operation area of the on-demand bus 1.

The streetlight 20 is installed on a road in the operation area of the on-demand bus 1, and illuminates the road as its main function. As shown in FIG. 2, the streetlight 20 in the present embodiment includes a light source 21, a drive unit 22, and a communication unit 23.

The light source 21 is a device that emits light to illuminate a road surface. The light source 21 in the present embodiment includes multi-color light emitting diodes (LEDs) to change a light color. The light source 21 is not limited to the LEDs, but may be any light source that can change the light color.

The drive unit 22 is a circuit that drives the light source 21. The drive unit 22 switches a state in which light is emitted from the light source 21 (the streetlight 20 is ON) and a state in which the light emission from the light source 21 is stopped (the streetlight 20 is OFF). The drive unit 22 changes (modulates) the light color of the light source 21 by adjusting the light emission amounts of the multi-color LEDs in the light source 21. The light emission, the stop of light emission, and the color modulation of the light source 21 by the drive unit 22 are performed in response to commands from the second server device 200.

The communication unit 23 is a device for connecting the streetlight 20 to a network N1. The network N1 is herein a wide area network (WAN) that is a global public communication network such as the Internet, or any other communication network. The communication unit 23 connects the streetlight 20 to the second server device 200 via the network N1. The communication unit 23 includes, for example, a local area network (LAN) interface board or a wireless communication circuit for wireless communication.

The hardware configuration of the streetlight 20 is not limited to that in the example shown in FIG. 2, and constituent elements may be omitted, replaced, or added as appropriate.

The first server device 100 is a computer that manages the operation of the on-demand bus 1, and is operated by the on-demand bus service provider. As shown in FIG. 2, the first server device 100 includes a processor 101, a main storage unit 102, an auxiliary storage unit 103, and a communication unit 104. The processor 101, the main storage unit 102, the auxiliary storage unit 103, and the communication unit 104 are connected to each other by a bus.

The processor 101 is, for example, a central processing unit (CPU) or a digital signal processor (DSP). The processor 101 controls the first server device 100 by performing various arithmetic processes.

The main storage unit 102 is a storage device that provides the processor 101 with a storage area and a working area for loading programs stored in the auxiliary storage unit 103 and is used as a buffer for arithmetic processes. The main storage unit 102 includes semiconductor memories such as a random access memory (RAM) and a read-only memory (ROM).

The auxiliary storage unit 103 stores, for example, various programs and data to be used by the processor 101 to execute the programs. The auxiliary storage unit 103 is, for example, an erasable programmable ROM (EPROM) or a hard disk drive (HDD). The auxiliary storage unit 103 may include a removable medium, that is, a portable recording medium. The removable medium is a disk recording medium such as a universal serial bus (USB) memory, a compact disc (CD), or a digital versatile disc (DVD). The auxiliary storage unit 103 stores various programs, various types of data, and various tables in the recording medium in a readable and writable manner.

The programs stored in the auxiliary storage unit 103 include, in addition to an operating system, a program for creating an operation plan of the on-demand bus 1, and a program for transmitting the first signal and the second signal to the second server device 200.

The communication unit 104 is a device for connecting the first server device 100 to the network N1. The communication unit 104 connects the first server device 100 to the second server device 200 via the network N1. The communication unit 104 includes, for example, a LAN interface board or a wireless communication circuit for wireless communication.

In the first server device 100 configured as shown in FIG. 2, the processor 101 loads the program in the auxiliary storage unit 103 into the main storage unit 102 and executes the program to create an operation plan of the on-demand bus 1. Specifically, the processor 101 determines an operation route and stop places (user's boarding place and user's drop-off place) for the on-demand bus 1 based on a boarding place and a drop-off place in a request from a user. The first server device 100 determines operation times of the on-demand bus 1 based on a boarding date and a drop-off date in the request from the user.

The method for determining the operation plan of the on-demand bus 1 is not limited to the method described above. For example, if the on-demand buses 1 whose operation route and operation times have already been determined include an on-demand bus 1 that will pass through the boarding place designated by the user at the boarding date designated by the user and will pass through the drop-off place designated by the user at the drop-off date designated by the user, the operation plan of the on-demand bus 1 may be created by adding the boarding place and the drop-off place designated by the user to the stop places for the on-demand bus 1.

The operation plan including the operation route, the stop places, and the operation times determined by the processor 101 is transmitted to a predetermined terminal through the communication unit 104. In a case where the on-demand bus 1 is an autonomous driving vehicle that can travel autonomously, the predetermined terminal is a terminal mounted on the on-demand bus 1. Therefore, the on-demand bus 1 can operate autonomously in accordance with the operation plan created by the first server device 100. In a case where the on-demand bus 1 is a vehicle that is manually driven by a driver, the predetermined terminal is a terminal used by the driver. Therefore, the driver can operate the on-demand bus 1 in accordance with the operation plan created by the first server device 100.

In the first server device 100, when the operation plan of the on-demand bus 1 is created, the processor 101 transmits the first signal including a request ID, a user's boarding place, and a user's boarding date to the second server device 200 through the communication unit 104. In the first server device 100, when the user has completed boarding the on-demand bus 1, the processor 101 transmits the second signal including the same request ID as that in the first signal to the second server device 200 through the communication unit 104. About the completion of the user's boarding on the on-demand bus 1, the on-demand bus 1 may notify the first server device 100 or the user's terminal may notify the second server device 200. Whether the user has completed boarding the on-demand bus 1 may be determined by the processor 101 of the first server device 100 based on position information of the terminal carried by the user and position information of the on-demand bus 1.

The hardware configuration of the first server device 100 is not limited to that in the example shown in FIG. 2, and constituent elements may be omitted, replaced, or added as appropriate. The series of processes executed by the first server device 100 may be executed by hardware or software.

The second server device 200 is a computer that controls the streetlights 20 installed in the operation area of the on-demand bus 1, and is operated by an administrator of the streetlights 20. As shown in FIG. 2, the second server device 200 includes a processor 201, a main storage unit 202, an auxiliary storage unit 203, and a communication unit 204. The processor 201, the main storage unit 202, and the auxiliary storage unit 203 are the same as the processor 101, the main storage unit 102, and the auxiliary storage unit 103 of the first server device 100, respectively, and therefore the description thereof will be omitted. Programs stored in the auxiliary storage unit 203 of the second server device 200 include a program for controlling the streetlights 20 in addition to an operating system.

The communication unit 204 of the second server device 200 connects the second server device 200 to the first server device 100 and the streetlights 20 via the network N1. The second server device 200 and the streetlights 20 may be connected to each other via dedicated signal lines instead of the network N1.

The hardware configuration of the second server device 200 is not limited to that in the example shown in FIG. 2, and constituent elements may be omitted, replaced, or added as appropriate. The series of processes executed by the second server device 200 may be executed by hardware or software.

Functional Configuration of Second Server Device

Next, the functional configuration of the second server device 200 in the present embodiment will be described with reference to FIG. 3. The second server device 200 in the present embodiment is an example of the "information processing device" according to the present disclosure, and includes, as its functional components, a reception unit F210, an identification unit F220, a command unit F230, a device management database D210, and a request management database D220.

The reception unit F210, the identification unit F220, and the command unit F230 are implemented by the processor 201 executing the program stored in the auxiliary storage unit 203. In this case, the processor 201 of the second server device 200 corresponds to the "control unit" according to the present disclosure. Any of the reception unit F210, the identification unit F220, and the command unit F230 or a part thereof may be implemented by a hardware circuit such as an application specific integrated circuit (ASIC) or a field programmable gate array (FPGA). In this case, the hardware circuit corresponds to the "control unit" according to the present disclosure.

The device management database D210 and the request management database D220 are constructed by a program of a database management system (DBMS) executed by the processor 201. Specifically, the DBMS program manages data stored in the auxiliary storage unit 203 to construct the device management database D210 and the request management database D220. The device management database D210 and the request management database D220 are, for example, relational databases.

Figure 4:
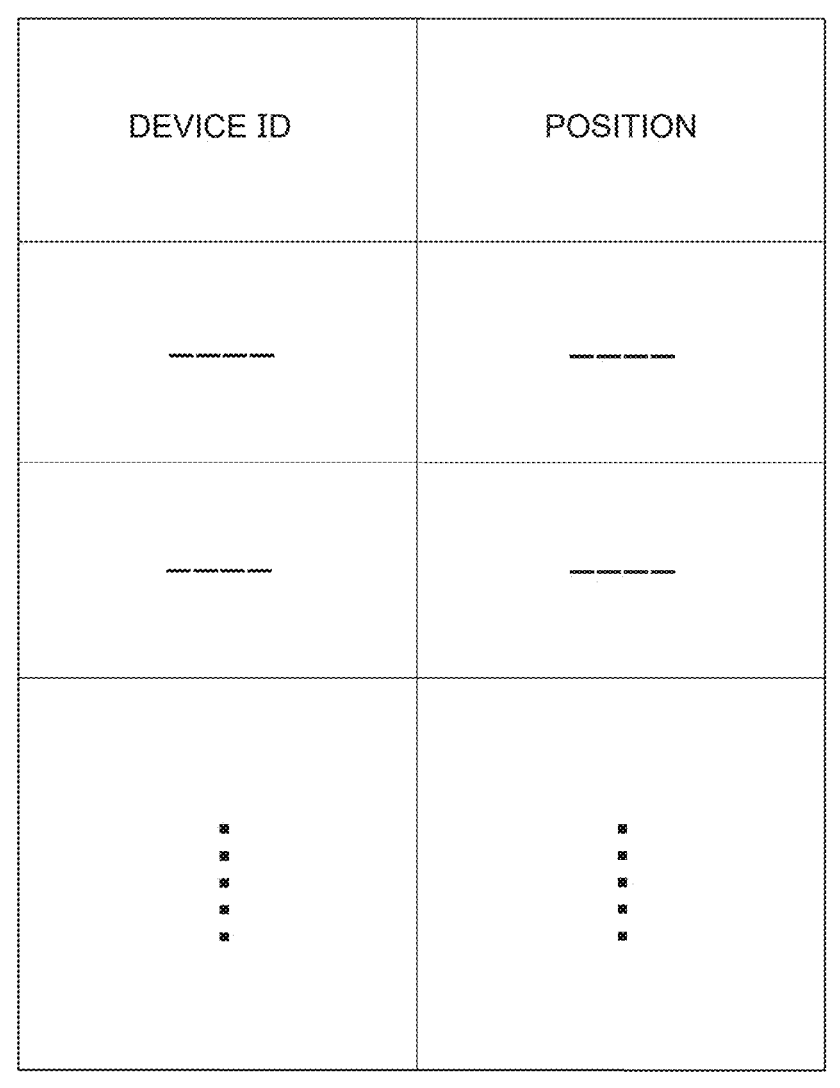

The device management database D210 stores information on the output devices 2 installed in the operation area of the on-demand bus 1. In the present embodiment, the device management database D210 stores information on the streetlights 20 installed in the operation area of the on-demand bus 1. FIG. 4 is a diagram showing an example of the information stored in the device management database D210. The device management database D210 shown in FIG. 4 stores a plurality of records associated with the streetlights 20 installed in the operation area of the on-demand bus 1. Each record in the device management database D210 includes a device ID field and a position field. The configuration of the records stored in the device management database D210 is not limited to that in the example shown in FIG. 4, and fields may be added, changed, or deleted as appropriate.

Information for identifying each streetlight 20 is stored in the device ID field. Position information of each streetlight 20 is stored in the position field. The position information stored in the position field is, for example, an address or a latitude and longitude of a place where each streetlight 20 is installed.

Figure 3:
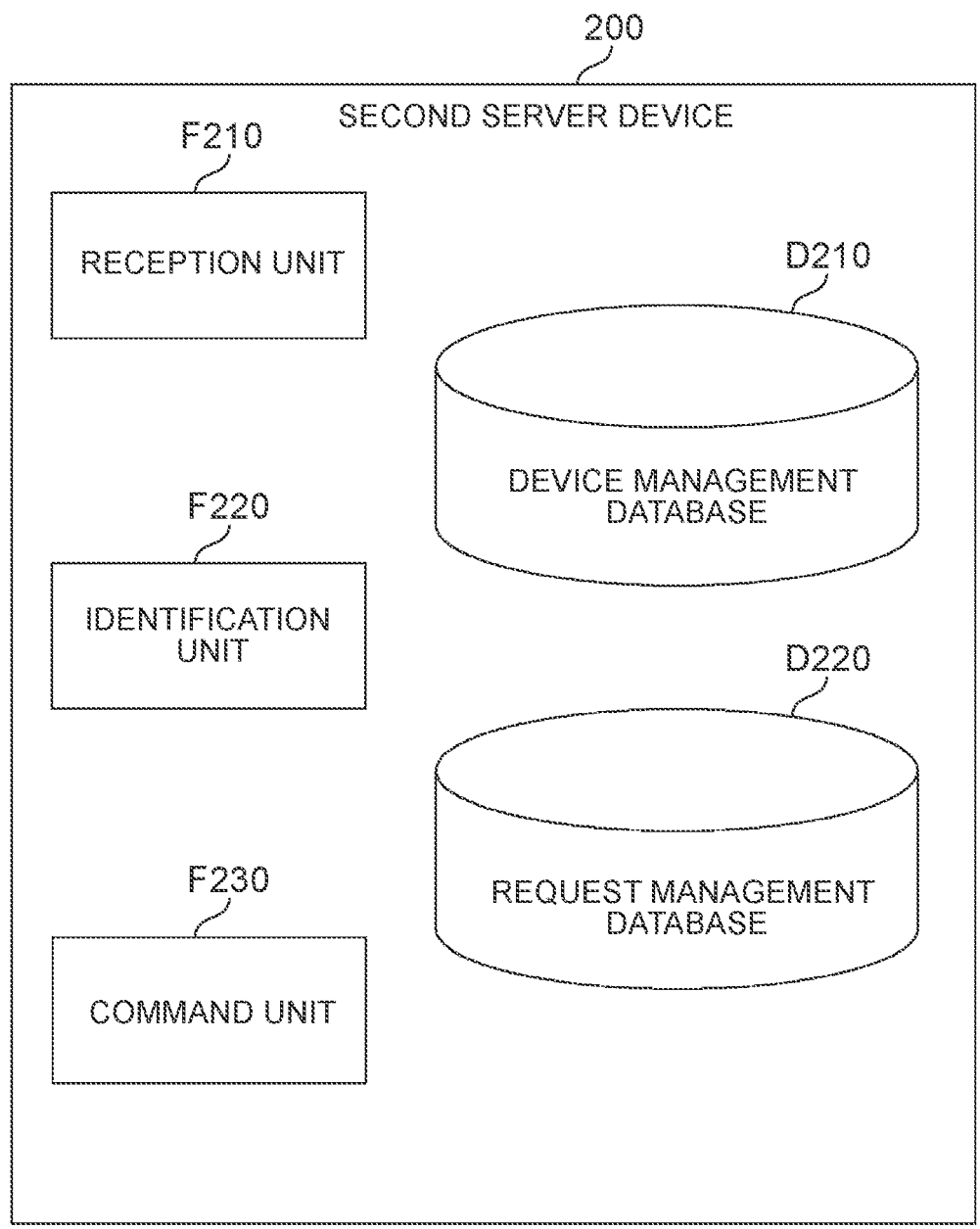
FIG. 3 is a block diagram showing an example of a functional configuration of the second server device according to the embodiment.
Figure 5:
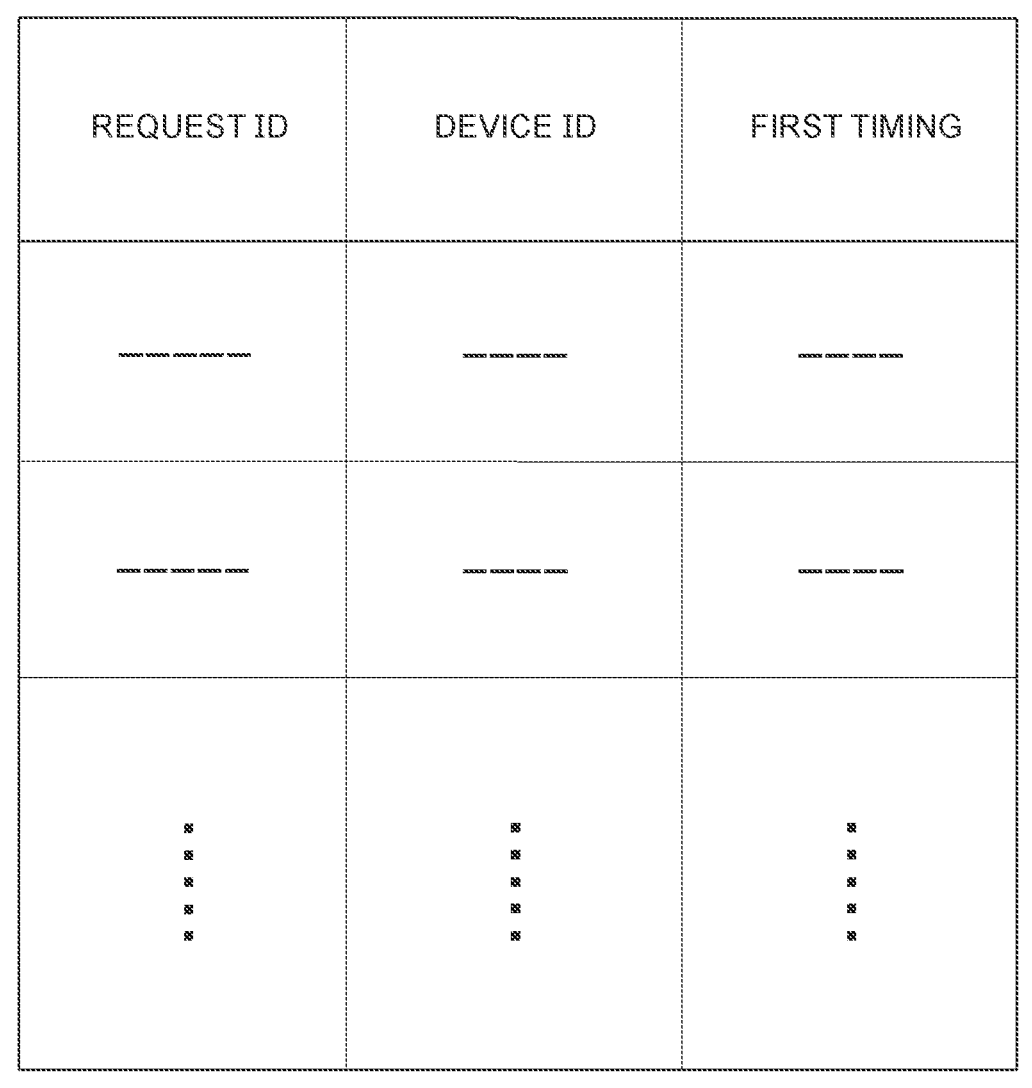

Returning to the description in FIG. 3, the request management database D220 stores information on requests (requests to output indications of bus stops) received from the first server device 100. FIG. 5 is a diagram showing an example of the information stored in the request management database D220. The request management database D220 shown in FIG. 5 stores records of individual requests received from the first server device 100. Each record in the request management database D220 includes a request ID field, a device ID field, and a first timing field. The configuration of the records stored in the request management database D220 is not limited to that in the example shown in FIG. 5, and fields may be added, changed, or deleted as appropriate.

A request ID in the first signal received from the first server device 100 is stored in the request ID field. Identification information (device ID) of the streetlight 20 for outputting the indication of the bus stop (first streetlight 20A) is stored in the device ID field. A date for causing the first streetlight 20A to start outputting the indication of the bus stop (first timing) is stored in the first timing field. The first timing is a time that is earlier by the first time length (for example, 5 to 15 minutes) than the user's boarding date.

Each record to be stored in the request management database D220 is generated in response to reception of the first signal from the first server device 100 by the second server device 200. The record is deleted from the request management database D220 in response to completion of the output of the indication of the bus stop.

Returning to the description in FIG. 3, the reception unit F210 receives the first signal from the first server device 100 through the communication unit 204. The first signal received by the reception unit F210 is sent from the reception unit F210 to the identification unit F220. The reception unit F210 also receives the second signal from the first server device 100 through the communication unit 204. The second signal received by the reception unit F210 is sent from the reception unit F210 to the command unit F230.

The identification unit F220 identifies the first streetlight 20A when the first signal is received from the reception unit F210. The first streetlight 20A is a streetlight 20 close to the user's boarding place among the streetlights 20 installed in the operation area of the on-demand bus 1. When identifying the first streetlight 20A, the identification unit F220 extracts a user's boarding place from the first signal. The identification unit F220 finds, among the records stored in the device management database D210, a record in which the position information stored in the position field indicates a position closest to the user's boarding place. The identification unit F220 reads a device ID stored in the device ID field of the found record. Thus, the first streetlight 20A is identified.

The identification unit F220 adds a new record to the request management database D220 based on a request ID in the first signal, the device ID of the identified first streetlight 20A, and a boarding date in the first signal. The request ID in the first signal is stored in the request ID field of the added record. The device ID of the first streetlight 20A identified by the identification unit F220 is stored in the device ID field of the added record. A time that is earlier by the first time length than the boarding date in the first signal is stored in the first timing field of the added record. When the record associated with the first signal is added to the request management database D220, the request ID in the first signal is sent from the identification unit F220 to the command unit F230.

The command unit F230 accesses the request management database D220 by using the request ID received from the identification unit F220 as an argument, and finds the record in which information that agrees with the request ID is registered in the request ID field. The command unit F230 compares a date registered in the first timing field of the found record with a current date to determine whether the first timing has come. When determination is made that the first timing has not come yet, the command unit F230 repeats the same determination process in a predetermined cycle. When determination is made that the first timing has come, the command unit F230 identifies the first streetlight 20A whose first timing has come based on the device ID stored in the device ID field of the found record. The command unit F230 transmits the first command signal to the identified first streetlight 20A through the communication unit 204. The first command signal includes a command to output an indication of a bus stop of the on-demand bus 1.

When the first timing is included in a lighting time frame of the streetlights 20 (time frame during which the streetlights 20 stay continuously ON), the command unit F230 may transmit, to the first streetlight 20A, the first command signal including a command to turn ON the first streetlight 20A in a light color different from those of the other streetlights 20. Alternatively, the command unit F230 may transmit, to the first streetlight 20A, the first command signal including a command to turn the first streetlight 20A intermittently ON (blink the first streetlight 20A). When the first timing is included in an unlit time frame of the streetlights 20 (time frame during which the streetlights 20 stay continuously OFF), the command unit F230 may transmit, to the first streetlight 20A, the first command signal including a command to keep the first streetlight 20A continuously ON or turn the first streetlight 20A intermittently ON. In the first streetlight 20A that has received the first signal described above, the first command signal is input to the drive unit 22 through the communication unit 23. The drive unit 22 drives the light source 21 in response to the command in the first command signal. Thus, the first streetlight 20A can be turned ON in a manner different from those of the other streetlights 20 installed around the user's boarding place. As a result, the user can find the boarding place of the on-demand bus 1 with the first streetlight 20A as a mark. In the case where the on-demand bus 1 is a vehicle that is manually driven by a driver, the driver can also find the user's boarding place with the first streetlight 20A as a mark.

When the second signal is sent from the reception unit F210 to the command unit F230, the command unit F230 extracts a request ID from the second signal. The command unit F230 accesses the request management database D220 by using the extracted request ID as an argument, and finds a record in which information that agrees with the request ID is stored in the request ID field. The command unit F230 identifies the first streetlight 20A to which the second command signal will be transmitted based on a device ID stored in the device ID field of the found record. The command unit F230 transmits the second command signal to the identified first streetlight 20A through the communication unit 204. The second command signal includes a command to stop the output of the indication of the bus stop of the on-demand bus 1.

When the timing to transmit the second command signal is included in the lighting time frame of the streetlights 20 and the first streetlight 20A is ON in a light color different from those of the other streetlights 20, the command unit F230 transmits, to the first streetlight 20A, the second command signal including a command to turn ON the first streetlight 20A in the same light color as those of the other streetlights 20. When the timing to transmit the second command signal is included in the lighting time frame of the streetlights 20 and the first streetlight 20A is blinking, the command unit F230 transmits, to the first streetlight 20A, the second command signal including a command to keep the first streetlight 20A continuously ON in the same manner as those of the other streetlights 20. When the timing to transmit the second command signal is included in the unlit time frame of the streetlights 20 and the first streetlight 20A is kept continuously ON or turned intermittently ON, the command unit F230 transmits, to the first streetlight 20A, the second command signal including a command to turn OFF the first streetlight 20A in the same manner as those of the other streetlights 20. Thus, the period during which the first streetlight 20A outputs the indication of the bus stop can be minimized, thereby securing the main function of the first streetlight 20A (function of illuminating the road during the lighting time frame and staying OFF during the unlit time frame).

When the command unit F230 has finished the transmission of the second command signal, the command unit F230 deletes the corresponding record from the request management database D220.

Processing Flow

Next, a flow of a process to be performed by the second server device 200 will be described with reference to FIG. 6. FIG. 6 is a flowchart showing a processing routine that is executed by the second server device 200 in response to reception of the first signal from the first server device 100 by the second server device 200. The main executor of the processing routine of FIG. 6 is the processor 201 of the second server device 200, but description will be given under the assumption that the main executor is each of the functional components of the second server device 200.

In the processing routine in FIG. 6, the reception unit F210 of the second server device 200 receives the first signal from the first server device 100 through the communication unit 204 (Step S101). The first signal is a signal for requesting output of an indication of a bus stop, and includes, for example, a user's boarding place, a user's boarding date, and a request ID. The reception unit F210 sends the received first signal to the identification unit F220. The identification unit F220 executes a process in Step S102 in response to reception of the first signal.

In Step S102, the identification unit F220 identifies the first streetlight 20A. As described above, the first streetlight 20A is a streetlight 20 close to the user's boarding place among the streetlights 20 installed in the operation area of the on-demand bus 1. When identifying the first streetlight 20A, the identification unit F220 extracts the user's boarding place from the first signal. The identification unit F220 finds, among the records stored in the device management database D210, a record in which the position information stored in the position field indicates a position closest to the user's boarding place. The identification unit F220 reads a device ID stored in the device ID field of the found record. Thus, the first streetlight 20A is identified. When the process in Step S102 is finished, the identification unit F220 executes a process in Step S103.

In Step S103, the identification unit F220 adds a new record to the request management database D220 based on the request ID in the first signal, the device ID of the identified first streetlight 20A, and the boarding date in the first signal. The request ID in the first signal is stored in the request ID field of the added record. The device ID of the first streetlight 20A identified by the identification unit F220 is stored in the device ID field of the added record. A time that is earlier by the first time length than the boarding date in the first signal is stored in the first timing field of the added record. When the identification unit F220 has finished the process in Step S103, the request ID in the first signal is sent from the identification unit F220 to the command unit F230. The command unit F230 executes a process in Step S104 in response to reception of the request ID.

In Step S104, the command unit F230 determines whether the timing to start outputting the indication of the bus stop of the on-demand bus 1 (first timing) has come. Specifically, the command unit F230 accesses the request management database D220 by using the request ID received from the identification unit F220 as an argument, and finds the record in which information that agrees with the request ID is registered in the request ID field. The command unit F230 compares a date registered in the first timing field of the found record with a current date to determine whether the first timing has come. When determination is made that the first timing has not come yet (negative determination in Step S104), the command unit F230 waits until the first timing comes. When determination is made that the first timing has come (positive determination in Step S104), the command unit F230 executes a process in Step S105.

In Step S105, the command unit F230 transmits the first command signal to the first streetlight 20A whose first timing has come through the communication unit 204. Specifically, the command unit F230 identifies the first streetlight 20A whose first timing has come based on the device ID stored in the device ID field of the record found in Step S104. The command unit F230 transmits the first command signal to the identified first streetlight 20A through the communication unit 204. The first command signal includes a command to output the indication of the bus stop of the on-demand bus 1. The command to output the indication of the bus stop of the on-demand bus 1 is a command to turn ON the first streetlight 20A in a manner different from those of the other streetlights 20 installed around the user's boarding place. For example, when the first timing is included in the lighting time frame of the streetlights 20, the manner different from those of the other streetlights 20 is such a manner that the first streetlight 20A is turned ON in a light color different from those of the other streetlights 20 or the first streetlight 20A blinks. When the first timing is included in the unlit time frame of the streetlights 20, the manner different from those of the other streetlights 20 is such a manner that only the first streetlight 20A is kept continuously ON or turned intermittently ON.

When the first command signal is received by the communication unit 23 of the first streetlight 20A, the first command signal is output from the reception unit F210 to the drive unit 22. The drive unit 22 drives the light source 21 in response to the command in the first command signal. Thus, the first streetlight 20A is turned ON in the manner different from those of the other streetlights 20 installed around the user's boarding place. As a result, the user and/or the driver of the on-demand bus 1 can find the boarding place with the first streetlight 20A as a mark.

Returning to the description in FIG. 6, after the execution of the process in Step S105, the reception unit F210 executes a process in Step S106. In Step S106, the reception unit F210 determines whether the communication unit 204 has received the second signal from the first server device 100. The second signal is a signal for requesting stop of the output of the indication of the bus stop, and includes the same request ID as the request ID in the first signal. The second signal is transmitted from the first server device 100 to the second server device 200 in response to completion of the user's boarding on the on-demand bus 1. When the communication unit 204 has not received the second signal yet (negative determination in Step S106), the reception unit F210 waits until the communication unit 204 receives the second signal. When the communication unit 204 has received the second signal (positive determination in Step S106), the reception unit F210 sends the second signal to the command unit F230. The command unit F230 executes a process in Step S107 in response to reception of the second signal.

In Step S107, the command unit F230 transmits the second command signal through the communication unit 204 to the first streetlight 20A outputting the indication of the bus stop of the on-demand bus 1. Specifically, the command unit F230 extracts the request ID from the second signal. The command unit F230 accesses the request management database D220 by using the extracted request ID as an argument, and finds a record in which information that agrees with the request ID is stored in the request ID field. The command unit F230 identifies the first streetlight 20A to which the second command signal will be transmitted based on a device ID stored in the device ID field of the found record. The command unit F230 transmits the second command signal to the identified first streetlight 20A. The second command signal includes a command to stop the output of the indication of the bus stop of the on-demand bus 1. The command to stop the output of the indication of the bus stop of the on-demand bus 1 is a command to turn ON or OFF the first streetlight 20A in the same manner as those of the other streetlights 20 installed around the user's boarding place. For example, when the timing to transmit the second command signal is included in the lighting time frame of the streetlights 20, the same manner as those of the other streetlights 20 is such a manner that the first streetlight 20A is kept continuously ON in the same light color as those of the other streetlights 20. When the timing to transmit the second command signal is included in the unlit time frame of the streetlights 20, the same manner as those of the other streetlights 20 is such a manner that the first streetlight 20A is kept continuously OFF.

When the second command signal is received by the communication unit 23 of the first streetlight 20A, the second command signal is output from the reception unit F210 to the drive unit 22. The drive unit 22 drives the light source 21 in response to the command in the second command signal. Therefore, the first streetlight 20A returns from the state in which the first streetlight 20A is ON in the manner different from those of the other streetlights 20 installed around the user's boarding place to the state in which the first streetlight 20A is ON or OFF in the same manner as those of the other streetlights 20 installed around the user's boarding place. As a result, the period during which the first streetlight 20A outputs the indication of the bus stop can be minimized. Thus, the main function of the first streetlight 20A (function of illuminating the road during the lighting time frame and staying OFF during the unlit time frame) can be secured.

Returning to the description in FIG. 6, when the process in Step S107 is finished, the command unit F230 executes a process in Step S108. In Step S108, the command unit F230 deletes the record found in Step S107 from the request management database D220. This processing routine is terminated when the command unit F230 has finished the process in Step S108.

Actions and Effects of Embodiment

According to the present embodiment, the streetlight 20 close to the user's boarding place (first streetlight 20A) can be turned ON in the manner different from those of the other streetlights 20 during the period from the timing that is earlier by the first time length than the user's boarding date (first timing) to the completion of the user's boarding on the on-demand bus 1. Thus, the user can find the boarding place with the first streetlight 20A as a mark when the user moves to the vicinity of the boarding place in time with the boarding date. In the case where the on-demand bus 1 is a vehicle that is manually driven by a driver, the driver can also find the boarding place with the first streetlight 20A as a mark. Thus, the user and the on-demand bus 1 can meet more securely. Further, it is possible to reduce the occurrence of a case where the user is worried about whether the on-demand bus 1 will stop at the place designated by the user.

According to the present embodiment, the indication of the bus stop can be output by using the streetlight 20 installed in the operation area of the on-demand bus 1. Therefore, there is no need to install a dedicated indication device for the on-demand bus 1 in the operation area. Further, the main function of the streetlight 20 can be secured by limiting the period during which the streetlight 20 outputs the indication of the bus stop of the on-demand bus 1 to the period from the first timing to the completion of the user's boarding on the on-demand bus 1.

First Modification

In the above embodiment, description has been given of the example of using the streetlight 20 as the output device 2. In the present modification, description will be given of an example of using an LED lamp provided on a guardrail or a bench along a roadside in the operation area of the on-demand bus 1.

The device management database D210 in the present modification stores a plurality of records associated with a plurality of LED lamps installed in the operation area of the on-demand bus 1. Information for identifying each LED lamp is stored in the device ID field of each record. Position information of each LED lamp is stored in the position field of each record. Along with this, identification information of the LED lamp for outputting the indication of the bus stop (LED lamp closest to the user's boarding place) is stored in the device ID field of the record stored in the request management database D220 in the present modification.

The identification unit F220 in the present modification identifies the LED lamp closest to the user's boarding place (hereinafter sometimes referred to as "first LED lamp") based on the user's boarding place in the first signal and the information stored in the position field of each record of the device management database D210.

The command unit F230 in the present modification transmits, at the first timing, the first command signal to the first LED lamp identified by the identification unit F220. In that case, the first command signal includes a command to turn ON the first LED lamp in a manner different from those of the other LED lamps installed around the user's boarding place. The manner different from those of the other LED lamps is such a manner that the first LED lamp is turned ON in a light color different from those of the other LED lamps when the other LED lamps are ON, only the first LED lamp blinks when the other LED lamps stay continuously ON, or only the first LED lamp is kept continuously ON or turned intermittently ON when the other LED lamps stay continuously OFF.

The command unit F230 in the present modification transmits the second command signal to the first LED lamp that has been turned ON in the manner different from those of the other LED lamps at a timing when the second server device 200 has received the second signal from the first server device 100. In that case, the second command signal includes a command to turn ON or OFF the first LED lamp in the same manner as those of the other LED lamps installed around the user's boarding place.

According to the present modification, the user and the driver of the on-demand bus 1 can find the boarding place with the first LED lamp as a mark. As a result, the same effects as those of the above embodiment can be obtained.

Second Modification

In the above embodiment, description has been given of the example of using the streetlight 20 as the output device 2. In the present modification, description will be given of an example of using a signage device provided on a guardrail, a pole (for example, a utility or telegraph pole), or an exterior wall of a shop that faces a road in the operation area of the on-demand bus 1.

The device management database D210 in the present modification stores a plurality of records associated with a plurality of signage devices installed in the operation area of the on-demand bus 1. Information for identifying each signage device is stored in the device ID field of each record. Position information of each signage device is stored in the position field of each record. Along with this, identification information of the signage device for outputting the indication of the bus stop (signage device closest to the user's boarding place) is stored in the device ID field of the record stored in the request management database D220 in the present modification.

The identification unit F220 in the present modification identifies the signage device closest to the user's boarding place (hereinafter sometimes referred to as "first signage device") based on the user's boarding place in the first signal and the information stored in the position field of each record of the device management database D210.

The command unit F230 in the present modification transmits, at the first timing, the first command signal to the first signage device identified by the identification unit F220. In that case, the first command signal includes a command to cause the first signage device to output a sign of the bus stop of the on-demand bus 1. The sign of the bus stop may be text information, illustrations, or the like.

The command unit F230 in the present modification transmits the second command signal to the first signage device outputting the sign of the bus stop of the on-demand bus 1 at a timing when the second server device 200 has received the second signal from the first server device 100. In that case, the second command signal includes a command to terminate the output of the sign of the bus stop of the on-demand bus 1.

According to the present modification, the user and the driver of the on-demand bus 1 can find the boarding place by using, as a mark, the first signage device outputting the sign of the bus stop. As a result, the same effects as those of the above embodiment can be obtained.

Third Modification

In the above embodiment, description has been given of the example of using the streetlight 20 as the output device 2. In the present modification, description will be given of an example of using an on-road indication device (lane lighting device) installed on a road in the operation area of the on-demand bus 1.

The device management database D210 in the present modification stores a plurality of records associated with a plurality of on-road indication devices installed on roads at a plurality of locations in the operation area of the on-demand bus 1. Information for identifying each on-road indication device is stored in the device ID field of each record. Position information of each on-road indication device is stored in the position field of each record. Along with this, identification information of the on-road indication device for outputting the indication of the bus stop (on-road indication device closest to the user's boarding place) is stored in the device ID field of the record stored in the request management database D220 in the present modification.

The identification unit F220 in the present modification identifies the on-road indication device closest to the user's boarding place (hereinafter sometimes referred to as "first on-road indication device") based on the user's boarding place in the first signal and the information stored in the position field of each record of the device management database D210.

The command unit F230 in the present modification transmits, at the first timing, the first command signal to the first on-road indication device identified by the identification unit F220. In that case, the first command signal includes a command to cause the first on-road indication device to output the sign of the bus stop of the on-demand bus 1. The sign of the bus stop may be text information, illustrations, or the like.

The command unit F230 in the present modification transmits the second command signal to the first on-road indication device outputting the sign of the bus stop of the on-demand bus 1 at a timing when the second server device 200 has received the second signal from the first server device 100. In that case, the second command signal includes a command to terminate the output of the sign of the bus stop of the on-demand bus 1.

According to the present modification, the user and the driver of the on-demand bus 1 can find the boarding place by using, as a mark, the first on-road indication device outputting the sign of the bus stop. As a result, the same effects as those of the above embodiment can be obtained.

Others

The embodiment and modifications described above are only examples, and the present disclosure may be modified as appropriate without departing from the gist of the present disclosure. The processes and components described in the above embodiment and modifications may be combined as desired as long as no technical contradiction occurs. For example, the embodiment and the first to third modifications may be combined. In that case, the second server device 200 may cause the indication of the bus stop to be output from the output device 2 closest to the user's boarding place among the streetlights 20, the LED lamps, the signage devices, and the on-road indication devices installed in the operation area of the on-demand bus 1. Priority levels may be assigned to the streetlights 20, the LED lamps, the signage devices, and the on-road indication devices based on the ease of recognition of the indication of the bus stop, and the output device 2 for outputting the indication of the bus stop may be determined in consideration of the priority levels. For example, when a plurality of types of output devices 2 is present within a range of several meters in radius about the user's boarding place, the indication of the bus stop may be output from the output device 2 of the type with the highest level of the ease of recognition of the indication of the bus stop among these output devices 2.

The process described as being executed by a single device may be executed by a plurality of devices in cooperation. Further, the process described as being executed by different devices may be executed by a single device. For example, the process executed by the second server device 200 may be executed by the first server device 100. In a computer system, the hardware configuration that implements functions can be changed flexibly.

The present disclosure may be embodied such that a computer program that implements the functions described in the above embodiment is supplied to a computer and is read and executed by one or more processors of the computer. The computer program may be provided to the computer by being stored in a non-transitory computer-readable storage medium connectable to a system bus of the computer, or may be provided to the computer via a network. The non-transitory computer-readable storage medium is a recording medium that can store information such as data and programs by electrical, magnetic, optical, mechanical, or chemical action and can be read from a computer or the like. Examples of the recording medium include any types of disk or disc such as magnetic disks (for example, a floppy (registered trademark) disk and a hard disk drive (HDD)) and optical discs (for example, a CD-ROM, a DVD, and a Blu-ray disc). Examples of the recording medium also include media such as a read-only memory (ROM), a random access memory (RAM), an EPROM, an electrically erasable programmable read-only memory (EEPROM), a magnetic card, a flash memory, an optical card, and a solid state drive (SSD).

What is claimed is:

1. An information processing device comprising a control unit configured to:
   identify a first output device close to a boarding place of an on-demand bus; and
   transmit, to the first output device, a first command to output an indication of a bus stop of the on-demand bus;
   wherein the control unit is configured to transmit the first command to the first output device when a terminal of a user expected to board the on-demand bus at the boarding place has entered a first area including the boarding place;
   wherein the first output device is a signage device installed on a guardrail close to the boarding place, and
   wherein the control unit is configured to transmit a command to output a sign indicating the bus stop to the signage device as the first command.

2. The information processing device according to claim 1, wherein the control unit is configured to transmit, to the first output device, a second command to stop output of the indication of the bus stop at a timing when the user has boarded the on-demand bus.

3. An information processing device comprising a control unit configured to:
identify a first output device close to a boarding place of an on-demand bus; and
transmit, to the first output device, a first command to output an indication of a bus stop of the on-demand bus;
wherein the control unit is configured to transmit the first command to the first output device when a terminal of a user expected to board the on-demand bus at the boarding place has entered a first area including the boarding place,
wherein the first output device is a signage device attached to a shop close to the boarding place, and
wherein the control unit is configured to transmit a command to output a sign indicating the bus stop to the signage device as the first command.

4. An information processing system comprising:
a plurality of output devices installed on and around, or on or around roads in an operation area of an on-demand bus; and
a server device connected to the output devices via a network,
wherein the server device is configured to:
identify a first output device close to a boarding place of the on-demand bus among the output devices; and
transmit, to the first output device, a first command to output an indication of a bus stop of the on-demand bus;
wherein the first output device is a first streetlight installed close to the boarding place, and
wherein the server device is configured to transmit, to the first streetlight as the first command, a command to turn ON the first streetlight in a manner different from manners of the other streetlights installed around the boarding place.

5. The information processing system according to claim 4, wherein the server device is configured to transmit, to the first streetlight as the first command, a command to turn ON the first streetlight in a light color different from light colors of the other streetlights installed around the boarding place.

6. The information processing system according to claim 4, wherein the server device is configured to transmit, to the first streetlight as the first command, a command to turn the first streetlight intermittently ON when the other streetlights installed around the boarding place stay continuously ON.

7. The information processing system according to claim 4, wherein the server device is configured to transmit, to the first streetlight as the first command, a command to keep the first streetlight continuously ON or turn the first streetlight intermittently ON when the other streetlights installed around the boarding place stay continuously OFF.

* * * * *